(12) United States Patent
Feistel

(10) Patent No.: US 11,852,243 B2
(45) Date of Patent: Dec. 26, 2023

(54) METHOD AND DEVICE FOR MONITORING THE CONDITION OF A PISTON ROD SEALING SYSTEM OF A PISTON COMPRESSOR

(71) Applicant: BURCKHARDT COMPRESSION AG, Winterthur (CH)

(72) Inventor: Norbert Feistel, Zurich (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 13 days.

(21) Appl. No.: 17/638,597

(22) PCT Filed: Aug. 27, 2020

(86) PCT No.: PCT/EP2020/074038
§ 371 (c)(1),
(2) Date: Feb. 25, 2022

(87) PCT Pub. No.: WO2021/038016
PCT Pub. Date: Mar. 4, 2021

(65) Prior Publication Data
US 2022/0325800 A1 Oct. 13, 2022

(30) Foreign Application Priority Data
Aug. 27, 2019 (EP) .................... 19193952

(51) Int. Cl.
*F16J 15/3296* (2016.01)
*F16J 15/00* (2006.01)
(52) U.S. Cl.
CPC ......... *F16J 15/3296* (2013.01); *F16J 15/004* (2013.01)
(58) Field of Classification Search
CPC ............................ F16J 15/004; F16J 15/3296
See application file for complete search history.

(56) References Cited

U.S. PATENT DOCUMENTS

| 5,412,977 A | 5/1995 | Schmohl et al. |
| 2008/0012236 A1* | 1/2008 | Reilly .................... F16J 15/26 277/318 |

(Continued)

FOREIGN PATENT DOCUMENTS

DE   202014102844 U1   8/2014

OTHER PUBLICATIONS

International Search Report for PCT/EP2020/074038, Prepared by the European Patent Office, dated Jan. 11, 2021, 6 pages including English Translation.

*Primary Examiner* — Gilbert Y Lee
(74) *Attorney, Agent, or Firm* — BROOKS KUSHMAN PC; John E. Nemazi

(57) ABSTRACT

A method for monitoring the condition of a piston rod sealing system of a piston compressor, the system having at least two annular chambers arranged one behind the other in a longitudinal direction and each having a sealing element arranged therein. A piston rod running through the sealing elements and the annular chambers is moved back and forth in the longitudinal direction, sealed by the sealing elements. The system has an inlet side and an outlet side, between which a difference in pressure occurs, and said difference in pressure has static and dynamic pressure component. When there is leakage gas in the annular chambers, at least the dynamic pressure component of the leakage gas is measured in the piston rod sealing system. A change in the condition of at least one of the sealing elements is determined from a change in the dynamic pressure component as a function of time.

17 Claims, 5 Drawing Sheets

(56) References Cited

U.S. PATENT DOCUMENTS

| 2009/0121440 | A1* | 5/2009 | Feistel | F16J 15/445 |
| | | | | 277/308 |
| 2015/0076768 | A1 | 3/2015 | De Kruijf et al. | |

\* cited by examiner

METHOD AND DEVICE FOR MONITORING THE CONDITION OF A PISTON ROD SEALING SYSTEM OF A PISTON COMPRESSOR

CROSS-REFERENCE TO RELATED APPLICATION

This application is the U.S. national phase of PCT Application No. PCT/EP2020/074038 filed on Aug. 27, 2020, which claims priority to EP Patent Application No. 19193952.9 filed on Aug. 27, 2019, the disclosures of which are incorporated in their entirety by reference herein.

The invention relates to a method and a device for monitoring the condition of a piston rod sealing system of a reciprocating compressor.

STATE OF THE ART

Document DE202014102844U1 discloses a piston rod packing for a reciprocating compressor. Such piston rod sealing systems are used, for example, to seal the compression chamber of a reciprocating compressor against ambient pressure. A reciprocating piston rod is connected on the one hand to a drive and on the other hand to a piston of the reciprocating compressor. The piston rod passes through the piston rod sealing system, so that the pressure between the compression chamber and the environment is relieved within the piston rod sealing system. In order to achieve a high sealing effect or low leakage for the piston rod sealing system, such a pressure packing preferably comprises frictional sealing elements, the sealing surfaces of which are in contact with the piston rod and therefore experience wear. Such piston rod sealing systems have the disadvantage that their leakage increases depending on the running time. Operators of such reciprocating compressors require reliable operation during a long running time of, for example, at least 8000 hours without the leakage in the piston rod sealing system having an unacceptably high value, or without the sealing elements exhibiting high wear, breakage or even elastic plastic deformation.

DISCLOSURE OF THE INVENTION

It is the object of the invention to provide a method and a device which allow a more reliable operation of a reciprocating compressor.

This object is solved with a method comprising the features of claim 1. Claims 2 to 10 concern further advantageous method steps. The object is further solved with a monitoring system comprising the features of claim 11. Claims 12 to 14 relate to further advantageous devices.

The object is solved in particular with a method for monitoring the condition of a piston rod sealing system of a reciprocating compressor comprising a compression chamber, wherein a gas is compressed in the compression chamber of the reciprocating compressor from a suction pressure to a discharge pressure, wherein the piston rod sealing system comprises at least two chamber rings arranged successively in a longitudinal direction, each with at least one sealing element arranged therein, wherein a piston rod extending through the sealing elements and the chamber rings is moved back and forth in the longitudinal direction and is sealed by the sealing elements, wherein the piston rod sealing system has an inlet side and an outlet side, the pressure of the compression chamber being applied to the inlet side, and a differential pressure occurring between the inlet side and the outlet side, the differential pressure occurring having a static pressure component and a dynamic pressure component, the dynamic pressure component being changed as a function of the crank angle, a leakage gas being located in the chamber rings, at least the dynamic pressure component of the leakage gas being measured in the piston rod sealing system, and a change in the state of at least one of the sealing elements being determined from a change in the dynamic pressure component as a function of time. The object is further solved in particular with a method for monitoring the condition of a piston rod sealing system of a reciprocating compressor, wherein the piston rod sealing system comprises at least two chamber rings arranged one after the other in a longitudinal direction, each with at least one sealing element arranged therein, wherein a piston rod running through the sealing elements and the chamber rings is moved back and forth in the longitudinal direction and sealed by the sealing elements, wherein the piston rod sealing system has an inlet side and an outlet side, between which a differential pressure occurs, wherein the differential pressure occurring has a static pressure component and a dynamic pressure component, and wherein a leakage gas is located in the chamber rings, wherein at least the dynamic pressure component of the leakage gas is measured in the piston rod sealing system, and wherein a change in the state of at least one of the sealing elements is determined from a change in the dynamic pressure component as a function of time.

The object is further solved in particular with a monitoring system for monitoring the condition of a piston rod sealing system of a reciprocating compressor, wherein the reciprocating compressor comprises a piston and a compression chamber, wherein a gas can be compressed by means of the piston in the compression chamber from a suction pressure to a discharge pressure, wherein the piston rod sealing system comprises at least two chamber rings arranged one after the other in a longitudinal direction, each with at least one sealing element arranged therein, wherein a piston rod movable back and forth in the longitudinal direction extends through the sealing elements and the chamber rings, wherein the piston rod is connected to the piston, wherein the piston rod sealing system has an inlet side and an outlet side, wherein the pressure of the compression chamber is applied to the inlet side, wherein at least one pressure sensor is provided for measuring at least the dynamic pressure component of a leakage gas located in the chamber rings, and wherein a storage and evaluation unit stores a plurality of measured dynamic pressure components, and wherein the evaluation unit monitors a change in the dynamic pressure component as a function of time and derives therefrom a change in state of at least one of the sealing elements. Furthermore, the object is solved in particular with a monitoring system for monitoring the condition of a piston rod sealing system of a reciprocating compressor, wherein the piston rod sealing system comprises at least two chamber rings arranged successively in a longitudinal direction, each with at least one sealing element arranged therein, wherein a piston rod movable back and forth in the longitudinal direction extends through the sealing elements and the chamber rings, wherein the piston rod is connected to a piston, wherein the piston rod sealing system has an inlet side and an outlet side, and wherein a pressure sensor is arranged at least one of the chamber rings for measuring at least the dynamic pressure component of a leakage gas located in the chamber rings, and wherein a storage and evaluation unit stores a plurality of measured dynamic pressure components, and wherein the evaluation unit monitors a change in the dynamic pressure component as a function of time and derives therefrom a change in state of at least one of the sealing elements.

The method according to the invention for monitoring the condition of the piston rod sealing system of a reciprocating compressor has the advantage that the condition of the piston rod sealing system or the wear of the sealing elements located in the piston rod sealing system can be monitored in a simple, cost-effective and very precise manner. Monitoring can be carried out, for example, at prescribed intervals, for example every few days, and particularly preferably continuously, by monitoring the condition of the sealing elements, for example, several times a minute or several times a day. With a prescribed uninterrupted running time of, for example, at least 8000 hours, this means that the piston rod sealing system is continuously monitored for about a year. The condition monitoring system according to the invention detects from the measured values the sealing effect of at least one single sealing element and preferably the sealing effect of a plurality or all of the sealing elements of a piston rod sealing system, so that the condition of the respective sealing element and preferably the individual condition of each sealing element concerning its sealing effect can be determined therefrom. Moreover, the condition monitoring according to the invention has the advantage that preferably a partial failure or a complete failure of a one ore more of the sealing elements can be predicted on the basis of the respective determined condition and can preferably be detected with a sufficiently large lead time, so that the monitoring system can advantageously issue a warning or condition message prior to a complete failure of the sealing elements, so that sufficient time is available for planning maintenance of the piston rod sealing system.

The operational reliability advantageously gained with the condition monitoring system according to the invention also allows the piston rod sealing system, if desired, to be operated maintenance-free for a period of more than 8000 hours. On the other hand, serious failures of the piston rod sealing system, for example a fracture or an elastic-plastic deformation of a sealing element, can also be clearly detected, and therefore maintenance can be scheduled and, for example, the remaining period of possible, reliable operation of the piston rod sealing system until maintenance is absolutely necessary can preferably be calculated.

In the method according to the invention, the condition or the sealing effect of the sealing elements arranged in a piston rod sealing system of a reciprocating compressor is detected. The reciprocating compressor comprises a reciprocating piston and a compression chamber, the piston acting on the compression chamber in such a way that a gas is compressed in the compression chamber from a suction pressure to a discharge pressure. The piston rod sealing system comprises at least two chamber rings arranged in succession in a longitudinal direction, each with at least one sealing element arranged therein, wherein a piston rod extending through the sealing elements and the chamber rings and connected to the piston is moved back and forth in the longitudinal direction and sealed by the sealing elements. The piston rod sealing system has an inlet side and an outlet side, the pressure of the compression chamber being applied to the inlet side, and a differential pressure occurring between the inlet side and the outlet side. Preferably, an external pressure or an ambient pressure, preferably of 1 bar, is applied to the outlet side. The differential pressure that occurs has a static pressure component, preferably the suction pressure, and a dynamic pressure component, the dynamic pressure component being varied as a function of the position of the piston or as a function of the crankshaft angle of the crankshaft driving the piston or piston rod. A leakage gas is present in the chamber rings and, if necessary, in the spaces between two chamber rings, and its pressure can be measured or determined with a corresponding sensor. Since the static pressure is a constant or very slowly changing pressure, the same static pressure is preferably present in the interior of all the chamber rings, since the static pressure is preferably relieved at the last sealing element facing the outlet side. Since all chamber rings preferably have essentially the same static pressure, no indication of the condition of a respective sealing element can be derived from the static pressure when using sealing elements designed as friction sealing rings. According to the invention, the pressure applied between the inlet side and the outlet side of the piston rod sealing system is divided into the static pressure and a dynamic pressure. The condition of a sealing element can be derived from the dynamic pressure. Of the sealing elements arranged in the piston rod sealing system and designed as friction sealing rings, the sealing elements facing the inlet side experience wear first, because essentially the entire dynamic pressure is applied to one of the sealing elements in each case. Due to the increasing wear of the sealing elements from the inlet side towards the outlet side, the dynamic pressure can be measured further and further from the inlet side towards the outlet side within the piston rod sealing system, or in other words, the dynamic pressure penetrates deeper and deeper into the piston rod sealing system. In contrast to the static pressure, the behavior of the dynamic pressure provides valuable information on the condition of the respective sealing elements arranged in the piston rod sealing system. Particularly advantageously, only the dynamic pressure of the piston rod sealing system is thus used, measured and/or calculated in order to derive therefrom, by observing the values as a function of time, the state or a change in state of at least one of the sealing elements and preferably of a plurality of the sealing elements.

A leakage gas in the piston rod sealing system causes a static and/or dynamic pressure drop of the individual sealing elements in the piston rod sealing system. This leakage gas has a static pressure component and a dynamic pressure component. According to the invention, a change in the dynamic pressure component is monitored as a function of time, from which change a conclusion can be drawn about the change in state of at least one sealing element, this change in state usually being caused by a change in tightness, for example due to wear, breakage or elastic-plastic deformation of the sealing element.

BRIEF DESCRIPTION OF THE DRAWINGS

The drawings used to explain the embodiments show.

In principle, the same parts are given the same reference signs in the drawings.

WAYS TO CARRY OUT THE INVENTION

Figure 1:
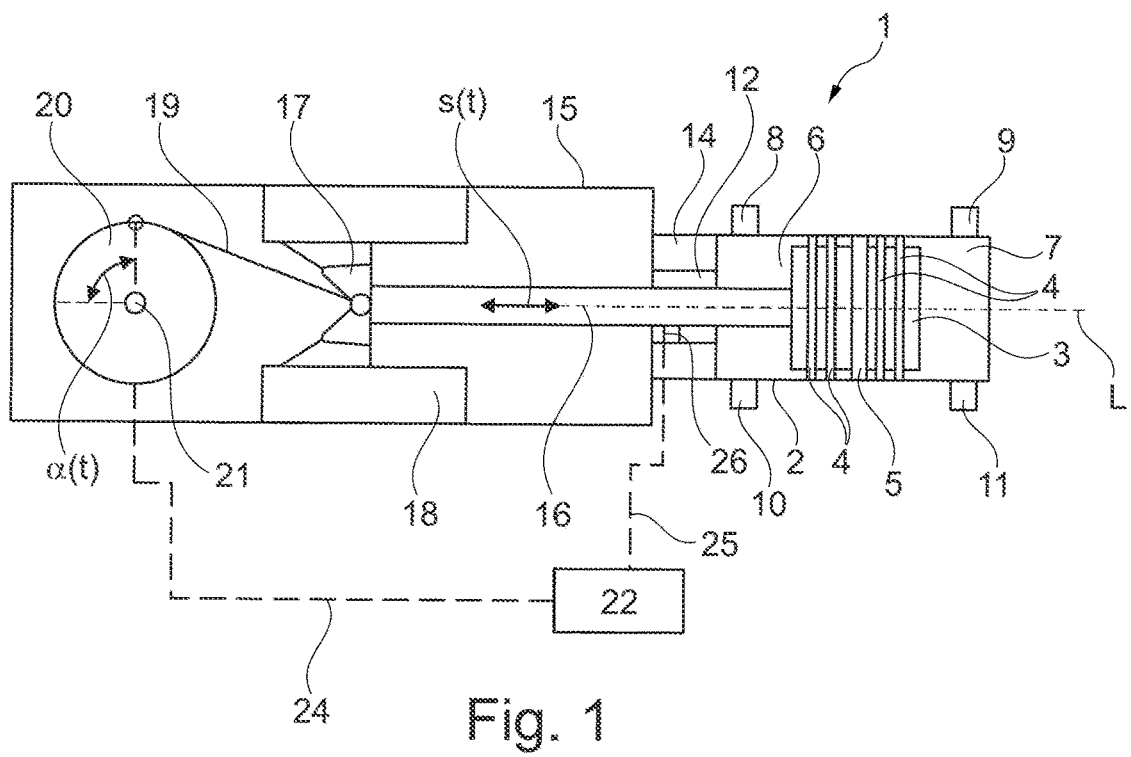
FIG. 1 a schematically simplified longitudinal section through a reciprocating compressor.

FIG. 1 shows a reciprocating compressor 1 for compressing a gas, comprising a cylinder 2 extending in the horizontal direction and comprising a piston 3 movable within the cylinder 2 in the longitudinal direction L or in the direction of extension of the cylinder 2. The reciprocating compressor 1 also comprises a piston rod 16, a piston rod sealing system 12, a crosshead 17 with a linear guide 18, a push rod 19, a crank 20 and a drive shaft 21. In the embodiment example shown, the piston 3 is of double-acting design and comprises sealing rings 4 and a guide ring 5, the piston 3 dividing the interior of the cylinder 2 into a first interior space 6 and a second interior space 7 or a first compression chamber and a second compression chamber 7, respectively, these two interior spaces each having an inlet valve 8, 9 and an outlet valve 10, 11. The cylinder 2 is connected to the housing 15 via an intermediate piece 14, with the piston rod sealing system 12 also being arranged in the intermediate piece. At least one sensor 26 is arranged in the piston rod sealing system 12 in order to detect a pressure within the piston rod sealing system 12 at least at one point. A monitoring device 22 detects, for example, the displacement s(t) of the piston 3 in the cylinder 7 as a function of time t, the displacement s(t) of the piston rod 16 as a function of time t, or a rotation angle a(t) of the drive shaft 21 as a function of time t via a signal line 24 and an additional sensor not shown in detail. The monitoring device 22 also detects, via the signal line 25, the value of the at least one sensor 26 for measuring the pressure in the piston rod sealing system 12.

Figure 2:
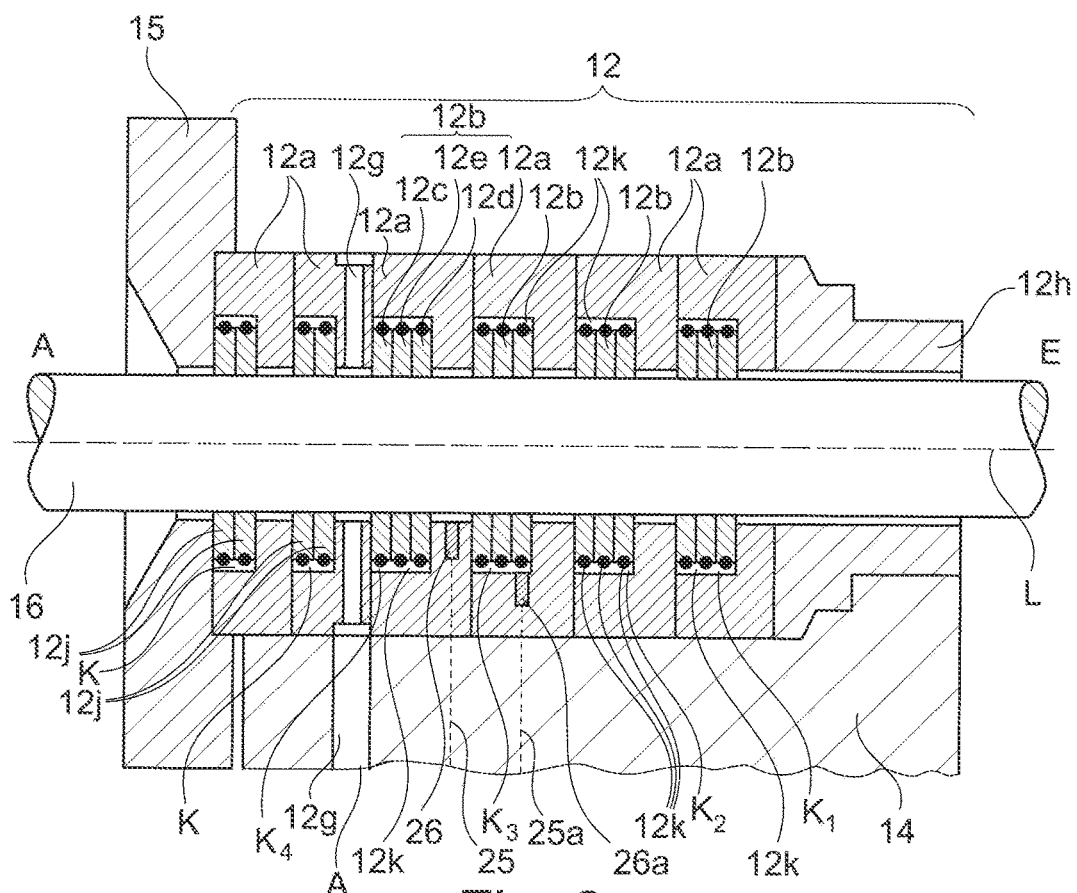
FIG. 2 a longitudinal section through a piston rod sealing system.

FIG. 2 shows a longitudinal section of an embodiment of a piston rod sealing system 12 comprising six chamber rings 12a, each chamber ring 12a delimiting towards the outside an internal cavity, a so-called chamber K. The piston rod sealing system 12 has an inlet side E, which, as can be seen from FIG. 1, faces the interior 6 or the compression chamber 6 of the cylinder 2, and has an opposite outlet side A, at which an atmospheric ambient pressure is normally present. The inlet side E is preferably arranged adjacent to the compression chamber 6 and preferably forms a boundary of the compression chamber 6, so that the compression chamber 6 and the piston rod sealing system 12 are fluid-conductively connected via the inlet side E. Starting from the inlet side E, the piston rod sealing system 12 shown as an example comprises six chamber rings 12a arranged in succession in the longitudinal direction L, the first four chamber rings 12a forming a first chamber K1, a second chamber K2, a third chamber K3 and a fourth chamber K4, in each of which a sealing element 12b is arranged, each sealing element 12b comprising a sealing ring 12e, a support ring 12c and a cover ring 12d. The sealing elements 12b could also be designed differently. A pressure sensor 26 is arranged between the third and fourth chambers K3, K4 in order to measure the pressure of the leakage gas in the intermediate space between the third chamber K3 and the fourth chamber K4, the pressure in the inner cavity of the fourth chamber K4 also corresponding to this pressure. A second pressure sensor 26a is also arranged in the third chamber K3 to measure the pressure of the leakage gas in this chamber K3. The pressure sensors 26, 26a are connected to the actuating device 22 via electrical lines 25, 25a. Following the fourth chamber ring 12a with chamber K4, a fifth and sixth chamber ring 12a are arranged on the left, in each of whose chambers K two lantern pieces 12j are arranged. The fifth chamber ring 12a additionally includes a leakage gas channel 12g, which at its exit opens into the atmospheric pressure environment, so that this exit can be referred to as outlet side A. The piston rod 16 extends through the lantern pieces 12j, the sealing elements 12b, and the chamber rings 12a. The piston rod sealing system 12 also includes a partial housing 12h. The piston rod sealing system 12 is arranged in the intermediate piece 14 and connected to the drive housing 15. The sealing elements 12b are designed as friction rings subject to wear, the sealing surfaces of which abut the surface of the piston rod 16 to thereby achieve a very low leakage. In order to maintain the high sealing effect of the sealing elements 12b during operation for as long a period as possible, the sealing elements 12b are designed in such a way that their sealing surfaces remain as completely as possible in contact with the piston rod 16 despite progressive wear, thus minimizing the passage area for the leakage gas. The sealing elements 12b thus exhibit wear compensation. The piston rod sealing system 12 according to FIG. 2 comprises a series arrangement of four such gas-tight sealing elements 12b, each sealing element 12b being arranged in a separate chamber ring 12a. A further embodiment example could, in contrast to the embodiment example according to FIG. 2, have no leakage gas channel 12g, whereby sealing elements 12b are arranged in the last two chamber rings 12a arranged on the left instead of the lantern pieces 12j, so that the outlet side A is located on the left in the area of the piston rod 16, as shown in FIG. 2.

Figure 3:
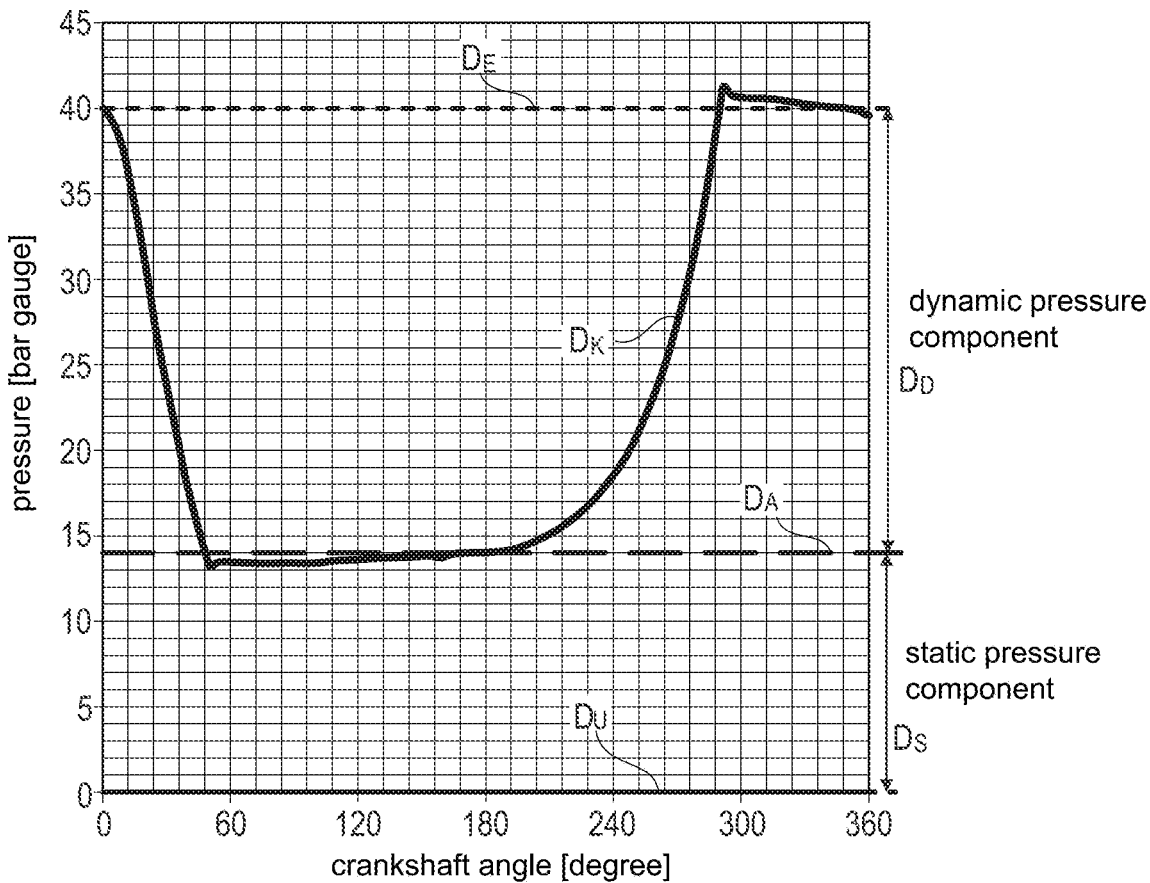
FIG. 3 shows the pressure at the inlet of the piston rod sealing system as a function of the crank angle.

FIG. 3 shows, by way of example, a possible course of the pressure of the first compression chamber 6, also referred to as the cylinder pressure $D_K$, or referred to as the differential pressure $D_K$ present between the inlet side E and the outlet side A, present at the inlet side of the piston rod sealing system 12 or in the first chamber K1 of the first chamber ring 12a during operation of the reciprocating compressor 1, as a function of the crankshaft angle, this course of the differential pressure $D_K$ being caused by the fluid compressed by the piston 3 inside the cylinder 2. A fluid to be conveyed is drawn in by piston 3 under a suction pressure $D_A$ and compressed in cylinder 2 to a discharge pressure $D_E$. During this suction and subsequent compression process, the pressure at the inlet side E of the piston rod sealing system 12 exhibits the course of the cylinder pressure $D_K$ or the differential pressure $D_K$, respectively, as a function of the crank angle α. The outlet side A and the leakage gas channel 12g exhibit, for example, the pressure of a subsequent compression stage or, in the present example, an ambient pressure $D_U$ of 0 bar. The pressure occurring in the piston rod sealing system 12 can be divided into a static pressure component $D_S$ and a dynamic pressure component $D_D$, as shown in FIG. 3. The static pressure component $D_S$ is preferably equal to the suction pressure $D_A$. The dynamic pressure component $D_D$ is the pressure component that changes as a function of time or as a function of the crank angle, the dynamic pressure component $D_D$ at the input side E corresponding to the difference between the cylinder pressure $D_K$ applied to the piston rod sealing system 12 and the suction pressure $D_A$ or the static pressure $D_S$, respectively. The static pressure component $D_S$ is the difference between the suction pressure $D_A$ of the compression stage under consideration and the pressure $D_U$ applied to the outlet side A, where in the present example the pressure $D_U$ corresponds to the atmospheric pressure, so that the static pressure component corresponds to the suction pressure $D_A$.

Figure 4:
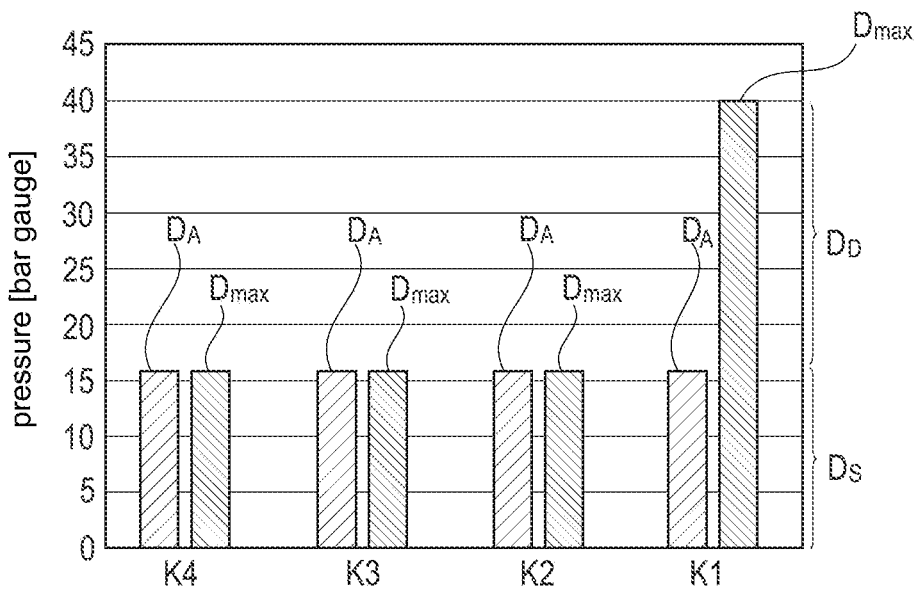
FIG. 4 The suction pressure and the dynamic pressure in successively arranged chamber rings with new sealing rings.
Figure 5:
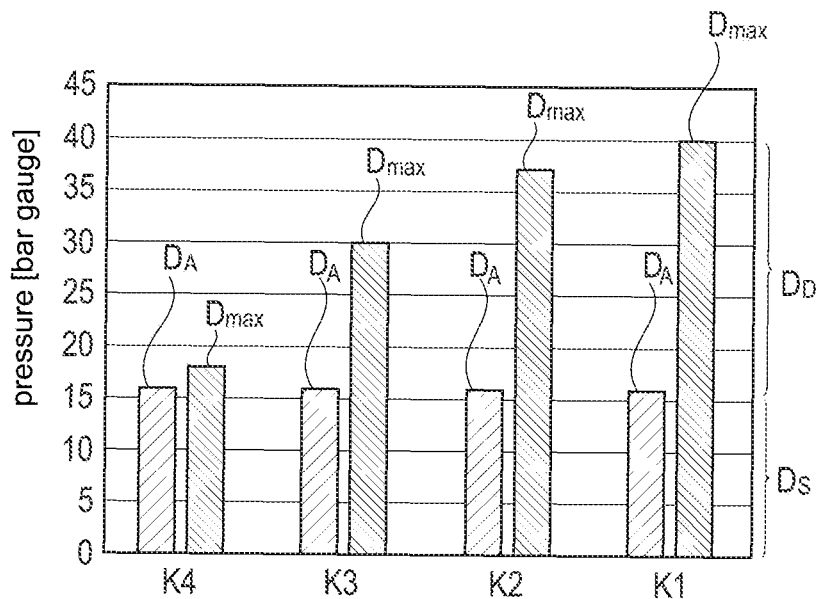
FIG. 5 the suction pressure as well as the dynamic pressure in successively arranged chamber rings with sealing rings, some of which show wear.

FIG. 4 shows an example of condition monitoring of the piston rod sealing system 12 according to FIG. 2. The first chamber ring 12a forms chamber K1, the second chamber ring 12a forms chamber K2, the third chamber ring 12a forms chamber K3, and the fourth chamber ring 12a forms chamber K4. In the example shown in FIG. 4, a pressure sensor 26, 26a is located in each of the four chambers by means of which the pressure in the respective chamber can be measured. The pressure sensors 26, 26a can be arranged in a variety of ways to measure the pressure in the respective chamber, for example also inside the chamber ring 12a, or outside the chamber ring 12, with a fluid conducting connection into the respective chamber. FIG. 4 shows for each of the four chambers K1, K2, K3, K4 the static pressure $D_A$ present in the respective chamber and the maximum pressure $D_{Max}$ occurring, which is $_D$composed of the static pressure component $D_S$ and the dynamic pressure component $D_D$. In the example shown, the static pressure component $D_S$ corresponds to the suction pressure $D_A$. The course of the pressure $D_K$ or the differential pressure $D_K$, respectively, is in principle dependent on the crankshaft angle or the position of the piston as a function of time. The maximum pressure $D_{Max}$ occurring in the respective chamber K1, K2, K3, K4, or the sum of static pressure component $D_S$ and dynamic pressure component $D_D$, on the other hand, depends on the sealing effect or the condition or wear of the respective sealing elements 12b. When new, the piston rod sealing system 12 exhibits a high maximum pressure $D_{Max}$ only in chamber K1, because the entire dynamic pressure component $D_D$ is sealed at the first frictional sealing element 12b, which is located in chamber K1. As the operating time progresses, the sealing elements 12b are subject to wear, which, as shown in FIG. 5, means that the maximum pressure $D_{Max}$, starting from the inlet side E, can penetrate into further internal chambers K2, K3, K4 of chamber rings 12a or can propagate from the inlet side E into these further chambers K2, K3, K4, so that in the individual chambers K1 to K4 the maximum pressures $D_{Max}$ shown in FIG. 5 are measured, for example. The condition of the piston rod sealing system 12 can now be monitored in the following ways, for example:

A) The pressure of the leakage gas is measured in a single chamber, namely in chamber K4, which is furthest away from the inlet side E. As long as the pressure measured therein essentially corresponds to the suction pressure $D_A$, it can be concluded that at least one of the sealing element 12b arranged upstream towards the inlet side E in the chambers K1, K2, K3 fulfills its sealing effect, so that no increased pressure is measured in chamber K4. From this it can be concluded that the dynamic pressure component $D_D$ is, preferably completely, sealed by one of the sealing elements 12d located in chambers K2, K3 or K4. In the embodiment example according to FIG. 5, an increased maximum pressure $D_{Max}$ is measured in chamber K4, from which it can be concluded that all sealing elements 12b arranged in chambers K1, K2 and K3 are no longer able to achieve a complete sealing effect due to their wear.

B) The pressure of the leakage gas is measured in each of the chambers K1, K2, K3 and K4, so that in addition to the value of the maximum pressure amplitude $D_{Max}$ in each chamber, a mutual comparison of the dynamic pressure components $D_D$ of the individual chambers K1 to K4 is also possible, or the distribution of the pressure in the individual chambers. It can be seen from the distribution shown in FIG. 5 that the sealing elements 12b in chambers K1, K2 and K3 already show considerable wear due to the measured, increased maximum pressure $D_{Max}$, and that the dynamic pressure component $D_D$ is essentially only sealed by the sealing element 12b located in chamber K4.

C) The measurement results shown in FIG. 5 are particularly informative if they are measured daily over a longer period of time, for example a month or a year, and the measurement results are stored, and if the change in the measurement results occurring over time is analyzed. As the operating time of the piston rod sealing system 12 increases, the maximum pressure $D_{Max}$ or the dynamic pressure component $D_D$, i.e. the difference between maximum pressure $D_{Max}$ and static pressure $D_A$, measured in the individual chambers K1, K2, K3 and K4, starting from chamber K1, will increase in the direction towards the outlet side A, so that it can be seen from the measurement results shown in FIG. 5 which of the sealing elements 12b and to what extent the individual sealing elements 12b still contribute to the sealing or to what extent the individual sealing selements 12b are already worn out. In other words, the maximum pressure $D_{Max}$ or the dynamic pressure component $D_D$ penetrates deeper and deeper into the piston rod sealing system 12 or into the subsequent chambers K2, K3 and K4 as the operating time increases, so that a change in the state of the sealing elements 12b can be determined via this change in the dynamic pressure components $D_D$ in the individual chambers as a function of time. The condition of the piston rod sealing system 12 and in particular the condition or wear of the individual sealing elements 12b, at least of one of the sealing elements 12b, can thus be determined or observed very precisely, so that it can be determined, for example, whether the piston rod sealing system 12 still seals reliably, or it can be extrapolated how long the piston rod sealing system 12 is expected to continue to seal reliably, or it can be estimated which of the sealing elements 12b and preferably also by which time these individual sealing selements 12b should be replaced or serviced.

Figure 7:
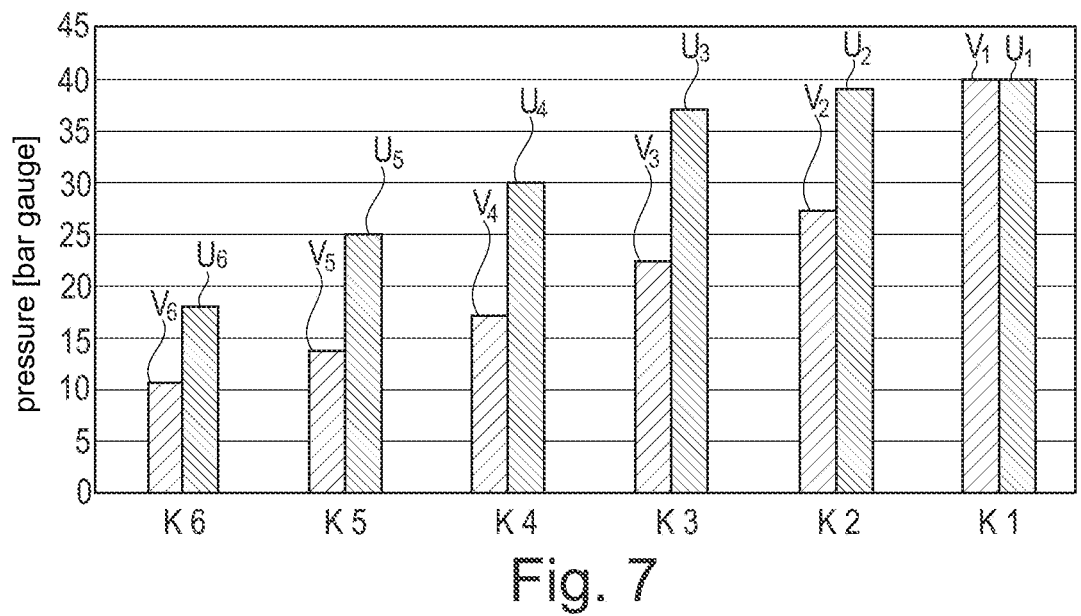
FIG. 7 another example of monitoring the condition of a piston rod sealing system.

FIG. 7 shows another example of condition monitoring of a piston rod sealing system 12. The measured values of the maximum pressure $D_{Max}$ of the chambers K1 to K6 shown in FIG. 7 were measured on a piston rod sealing system 12 which, in contrast to the piston rod sealing system shown in FIG. 2, has six chambers K1 to K6 arranged one after the other in the longitudinal direction L, each with a sealing element 12b arranged therein, wherein the sealing elements 12b, in contrast to the embodiment example according to FIG. 2, do not touch the piston rod 16 or only touch it slightly, so that there is at least partially a gap between the end face of the sealing elements 12b and the piston rod 16. With such a series connection of frictionless sealing elements 12b, the pressure difference is distributed in different amounts to all chambers K1 to K6. The method according to the invention is also suitable for monitoring the condition of such a piston rod sealing system 12. FIG. 7 shows with the values U1 to U6 the maximum pressure $D_{Max}$ present in the respective chamber K1 to K6 for a piston rod sealing system 12 in the new state. FIG. 7 shows with the values V1 to V6 the maximum pressure $D_{Max}$ present in the respective chamber K1 to K6 after a certain period of operation, for example after 2000 hours of operation. The change in the dynamic pressure component $D_D$ that has occurred during this period of operation, or the change in the condition of each of the sealing elements 12b located in the respective chamber K1 to K6, can be seen from the difference in the values U1–V1, or U2–V2, etc. Thus, the condition of the piston rod sealing system 12 or the condition of the individual sealing elements 12b located therein can be monitored, for example, in order to detect any necessary maintenance of the sealing elements 12b at an early stage, on the one hand to ensure safe operation of the piston rod sealing system 12, and on the other hand to define a time window for any necessary maintenance.

Figure 6:
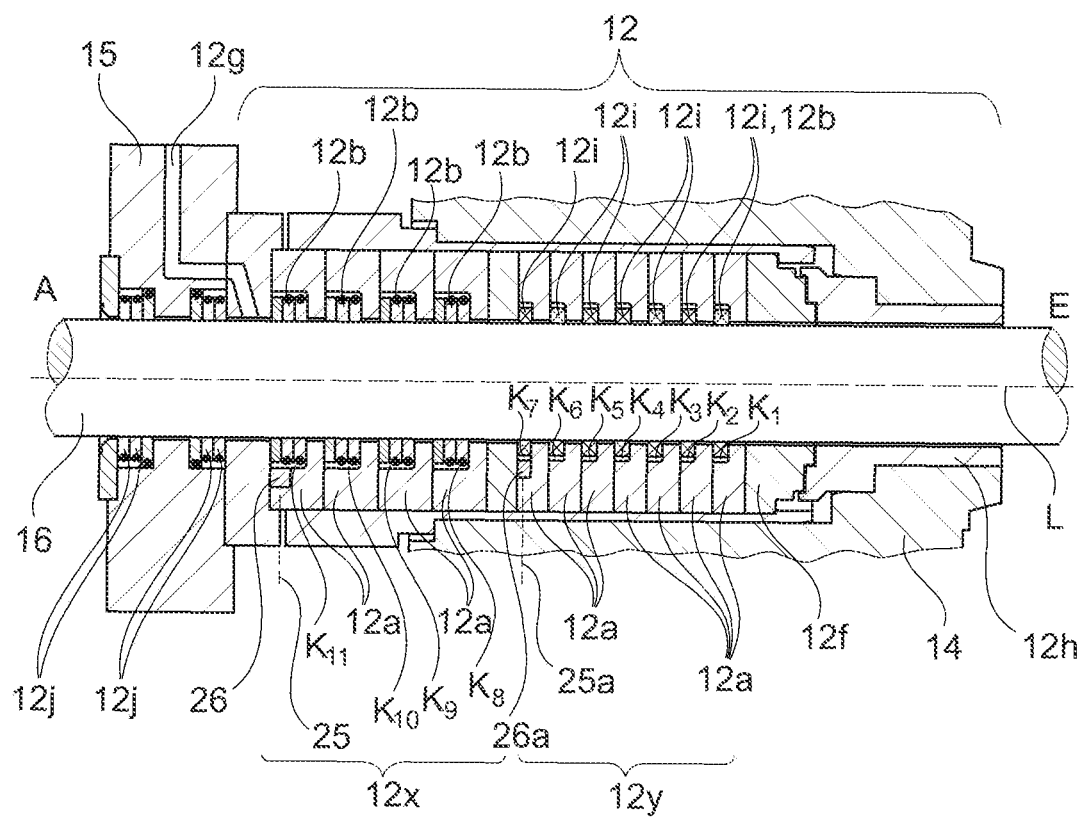
FIG. 6 a longitudinal section through another piston rod sealing system.
Figure 9:
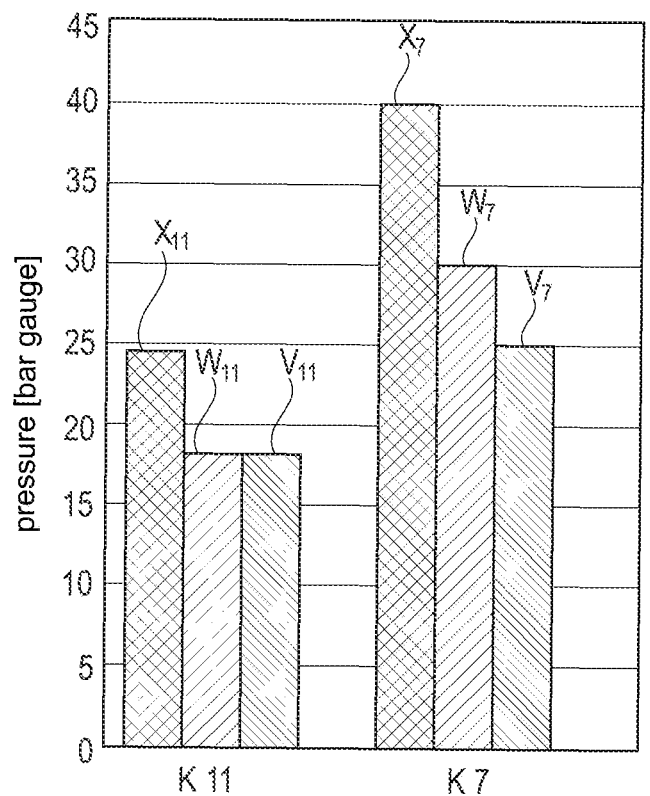
FIG. 9 another example of monitoring the condition of a piston rod sealing system.

FIG. 6 shows a longitudinal section through a further piston rod sealing system 12, which comprises a first partial packing 12x and a second partial packing 12y. The first partial packing 12x comprises the same chamber rings 12a with chambers K8, K9, K10, K11 as shown in FIG. 4, as well as frictional sealing elements 12b arranged in these chambers, each comprising a sealing ring 12e, a support ring 12c and a cover ring 12d. The piston rod sealing system 12 according to FIG. 6 also comprises a leakage gas channel 12g and, arranged downstream towards the outlet side A, two chamber rings 12a with lantern pieces 12j arranged therein. The second partial packing 12y comprises seven chamber rings 12a arranged in succession in the longitudinal direction L and having chambers K1, K2, K3, K4, K5, K6 and K7, a pressure breaker ring 12i being arranged in each of these chambers as a sealing element 12b. Such a pressure breaker ring 12i has the property that it does not completely seal off the leakage gas in the longitudinal direction L, but that it reduces the amplitude of the dynamic pressure component $D_D$. In the illustrated embodiment example, a sensor 26 is arranged to monitor the pressure in chamber K11 and a sensor 26a is arranged to monitor the pressure in chamber K7. Such an arrangement is again suitable for monitoring the condition of the piston rod sealing system 12 or the condition of the sealing elements 12b located therein. FIG. 9 shows the measured values V7, V11 of the maximum pressure $D_{Max}$ in chambers K7 and K11 of a piston rod sealing system 12 when new, and shows with values W7, W11 the measured values of the maximum pressure $D_{Max}$ in chambers K7 and K11 after, for example, 5000 hours of operation, and shows with values X7, X11 the measured values of the maximum pressure $D_{Max}$ in chambers K7 and K11 after, for example, 10000 hours of operation. These values show that the piston rod sealing system 12 still functions reliably after 5000 hours of operation, whereas the value X7 shows that the pressure breaker rings 12i or the second partial packing 2y no longer provide a sufficient sealing effect after 10000 hours of operation, whereas the sealing effect of the first partial packing 12x still meets the requirements.

In a further advantageous embodiment, in the piston rod sealing system 12 according to FIG. 6, starting from the inlet side E, a pressure sensor 26a can be arranged in the last chamber ring 12a with pressure breaker ring 12i arranged therein, therefore in chamber K7, and a pressure sensor 26 can be arranged in the first chamber ring 12a with friction seal ring 12e arranged therein, therefore in chamber K8, in order to detect the state or a change in state of the pressure breaker ring 12i arranged in chamber 7 in the best possible way.

Figure 8:
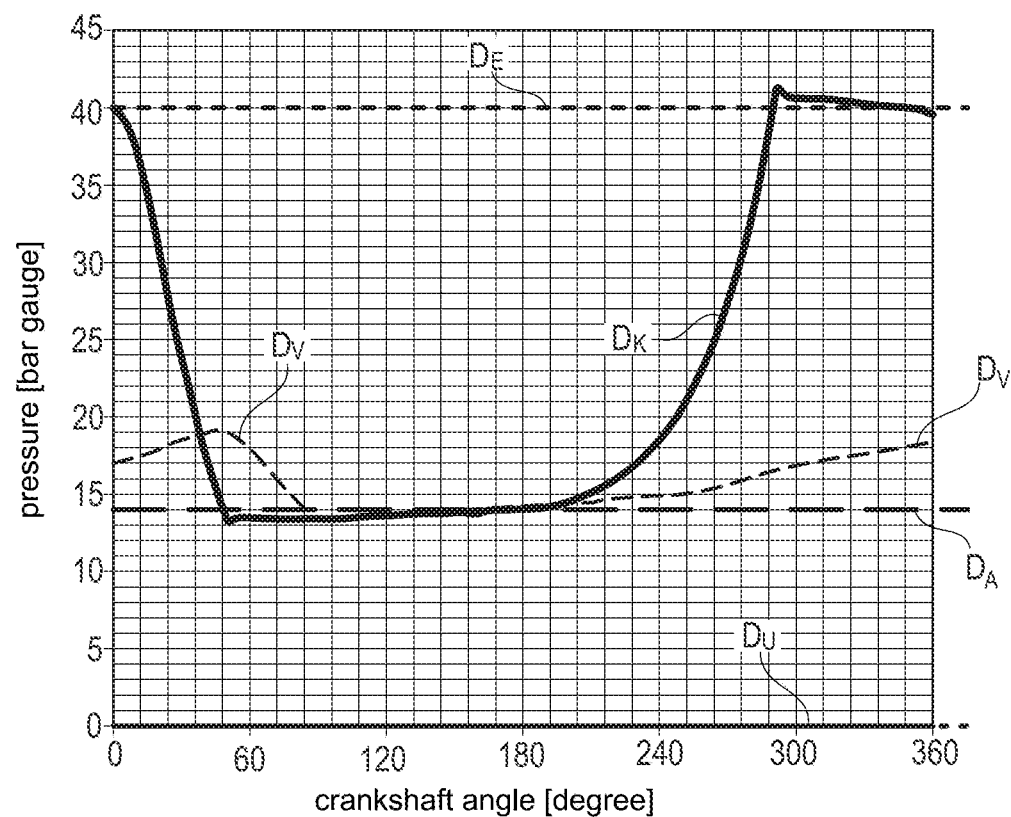
FIG. 8 a curve of a dynamic pressure as a function of the crankshaft angle.

In the embodiment examples shown in FIGS. 4, 5 and 7, the pressure in the respective chambers K is monitored in each case by measuring the maximum pressure occurring in the respective chamber K. The pressure in the respective chamber K is then measured. Instead of the maximum pressure occurring, the pressure curve can also be measured as a function of the crankshaft angle. FIG. 8 shows such a pressure curve $D_V$ as a function of the crankshaft angle. From the increase during the rising edge, the maximum value, the crankshaft angle at which the maximum value is reached, or the decrease during the falling edge, statements about the condition of the sealing elements 12b can also be derived.

It may prove advantageous to additionally measure a temperature T in the piston rod sealing system 12 at least at one point, in particular the temperature of the piston rod 16, for example with an infrared sensor. An intact, functioning friction ring results in the piston rod 16 heating up due to the friction that occurs. Detection of the temperature at a point in the piston rod sealing system 12, in particular the piston rod 16, provides an additional indication of the condition of a sealing element 12b. In addition, a broken sealing element 12b and/or an elastically-plastically deformed sealing element 12 can also lead to heating of the piston rod 16 and this condition can be detected by measuring the temperature.

Figure 10:
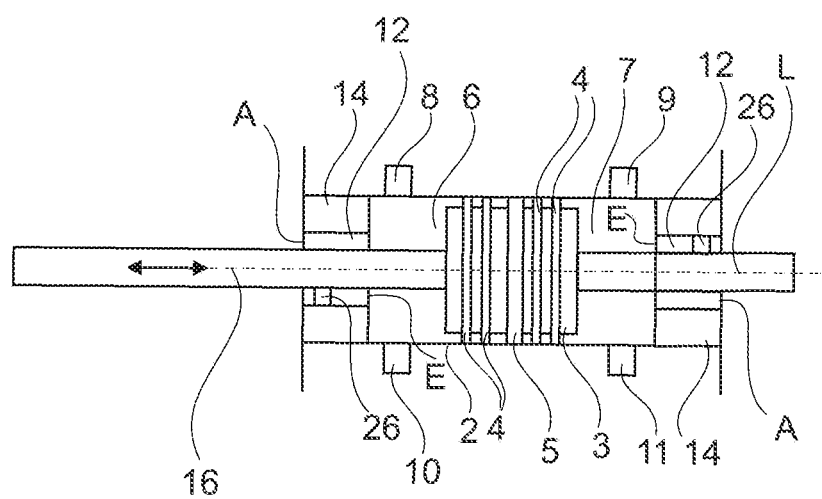
FIG. 10 a schematically simplified longitudinal section through a further embodiment of a cylinder with piston and piston rod sealing system.

FIG. 10 shows a schematically simplified longitudinal section through a further embodiment of a cylinder 2 with a double-acting piston 3, which divides the interior into a first compression chamber 6 and a second compression chamber 7. In contrast to the embodiment according to FIG. 1, an additional piston rod sealing system 12 is arranged on the end face of the second compression chamber 7, wherein the piston rod 16, in contrast to the embodiment according to FIG. 1, is extended from the piston 3 in the direction of the longitudinal axis L, extends through the additional piston rod sealing system 12, and is mounted so as to be displaceable in the direction of the longitudinal axis L. Thus, both piston rod sealing systems 12 have an inlet side E and an outlet side A, and at least one and preferably both piston rod sealing systems 12 can be operated with the condition monitoring method according to the invention.

In the example shown, the piston compressor 1 is always shown as a horizontal piston compressor. However, the piston compressor could also run in a different direction and, in particular, could also be designed to run in a vertical direction, with a vertically running piston rod.

All illustrated embodiments show a double-acting piston 3, but the piston could also have a single-acting design, in that the cylinder 2 has only a single compression chamber 6.

A plurality of piston compressors 1 or a plurality of cylinders 2 could also be connected in series, for example 2, 3, 4 or 5, with the final pressure of the preceding cylinder forming the suction pressure of the following cylinder. In such a serial arrangement, for example, the suction pressure $D_A$ of one of the cylinders could be 80 bar, and the final pressure $D_E$ of this cylinder could be 300 bar. At least one, and preferably all, of the reciprocating compressors 1 connected in series in this way, or the cylinders 2 connected in series, can be operated according to the method according to the invention, or have the device according to the invention.

The invention claimed is:

1. A method for monitoring the condition of a piston rod sealing system of a reciprocating compressor comprising a compression chamber, wherein in the compression chamber of the reciprocating compressor a gas is compressed from a suction pressure ($D_A$) to a discharge pressure ($D_E$), the piston rod sealing system comprising at least two chamber rings arranged one after the other in a longitudinal direction (L) and each having at least one sealing element arranged therein, wherein a piston rod extending through the sealing elements as well as the chamber rings is moved back and forth in the longitudinal direction (L) and is sealed by the sealing elements, wherein the piston rod sealing system has an inlet side (E) and an outlet side (A), wherein the pressure of the compression chamber is applied to the inlet side (E), and wherein a differential pressure ($D_K$) occurs between the inlet side (E) and the outlet side (A), the differential pressure ($D_K$) occurring having a static pressure component ($D_S$) and a dynamic pressure component ($D_D$), wherein the dynamic pressure component ($D_D$) is changed as a function of the crank angle, and wherein a leakage gas is located in the chamber rings, wherein at least the dynamic pressure component ($D_D$) of the leakage gas is measured in the piston rod sealing system, and wherein a change in the state of at least one of the sealing elements is determined from a change in the dynamic pressure component ($D_D$) as a function of time.

2. The method of claim 1, wherein the static pressure component ($D_S$) corresponds to the suction pressure ($D_A$), and wherein the dynamic pressure component ($D_D$) is determined as the difference between the differential pressure ($D_K$) and the static pressure component ($D_S$).

3. The method of claim 1, wherein the sealing element is configured to be gas-tight by forming a friction seal ring that abuts the piston rod, the friction seal ring being sealed by the friction occurring between the friction seal ring and the piston rod.

4. The method according to claim 3, wherein the dynamic pressure component ($D_D$) of the leakage gas is measured at least at that chamber ring which is arranged furthest away from the inlet side (E) in the longitudinal direction (L).

5. The method of claim 1, wherein the sealing element comprises at least one pressure breaker ring that does not seal completely.

6. The method according to claim 1, wherein a change in the dynamic pressure component ($D_D$) is monitored for a period of at least 2000 hours.

7. The method according to claim 6, wherein a change in the dynamic pressure component is monitored for a period of at least 8000 hours.

8. The method according to claim 1, wherein a temperature (T) is measured in the piston rod sealing system at least at one point.

9. The method according to claim 8, wherein the temperature of the piston rod is measured.

10. A method for monitoring the condition of a piston rod sealing system of a reciprocating compressor comprising a compression chamber, wherein in the compression chamber of the reciprocating compressor a gas is compressed from a suction pressure ($D_A$) to a discharge pressure ($D_E$), the piston rod sealing system comprising at least two chamber rings arranged one after the other in a longitudinal direction (L) and each having at least one sealing element arranged therein, wherein a piston rod extending through the sealing elements as well as the chamber rings is moved back and forth in the longitudinal direction (L) and is sealed by the sealing elements, wherein the piston rod sealing system has an inlet side (E) and an outlet side (A), wherein the pressure of the compression chamber is applied to the inlet side (E), and wherein a differential pressure ($D_K$) occurs between the inlet side (E) and the outlet side (A), the differential pressure ($D_K$) occurring having a static pressure component ($D_S$) and a dynamic pressure component ($D_D$), wherein the dynamic pressure component ($D_D$) is changed as a function of the crank angle, and wherein a leakage gas is located in the chamber rings, wherein at least the dynamic pressure component ($D_D$) of the leakage gas is measured in the piston rod sealing system, and wherein a change in the state of at least one of the sealing elements is determined from a change in the dynamic pressure component ($D_D$) as a function of time; wherein the sealing element comprises at least one pressure breaker ring that does not seal completely, and wherein the piston rod sealing system comprises, starting from the inlet side (E) in the longitudinal direction (L), a plurality of chamber rings with pressure breaker rings arranged therein and subsequently a plurality of chamber rings with friction seal rings arranged therein, and that the dynamic pressure component ($D_D$) of the leakage gas is measured in the last chamber ring with pressure breaker ring arranged therein or in the first chamber ring with friction seal ring arranged therein.

11. A method for monitoring the condition of a piston rod sealing system of a reciprocating compressor comprising a compression chamber, wherein in the compression chamber of the reciprocating compressor a gas is compressed from a suction pressure ($D_A$) to a discharge pressure ($D_E$), the piston rod sealing system comprising at least two chamber rings arranged one after the other in a longitudinal direction (L) and each having at least one sealing element arranged therein, wherein a piston rod extending through the sealing elements as well as the chamber rings is moved back and forth in the longitudinal direction (L) and is sealed by the sealing elements, wherein the piston rod sealing system has an inlet side (E) and an outlet side (A), wherein the pressure of the compression chamber is applied to the inlet side (E), and wherein a differential pressure ($D_K$) occurs between the inlet side (E) and the outlet side (A), the differential pressure ($D_K$) occurring having a static pressure component ($D_S$) and a dynamic pressure component ($D_D$), wherein the dynamic pressure component ($D_D$) is changed as a function of the crank angle, and wherein a leakage gas is located in the chamber rings, wherein at least the dynamic pressure component ($D_D$) of the leakage gas is measured in the piston rod sealing system, and wherein a change in the state of at least one of the sealing elements is determined from a change in the dynamic pressure component ($D_D$) as a function of time; wherein the dynamic pressure component ($D_D$) of the leakage gas is measured in a plurality of chamber rings, and wherein the state of the sealing element located in the respective chamber ring is determined on the basis of the maximum amplitude ($D_{max}$) measured in the individual chamber rings.

12. The method according to claim 11, wherein a maximum amplitude ($D_{max1}$, $D_{max2}$, $D_{max3}$) of the dynamic pressure components ($D_D$) present in the respective chamber ring increases from the inlet side (E) towards the outlet side (A) with increasing operating time of the piston rod sealing system, and wherein the state of the sealing elements located in these chamber rings is determined from the difference in the maximum amplitude ($D_{max1}$, $D_{max2}$, $D_{max3}$) of two adjacent chamber rings.

13. A monitoring system for monitoring the condition of a piston rod sealing system of a reciprocating compressor, wherein the piston compressor comprises a piston and a compression chamber, wherein a gas can be compressed by means of the piston in the compression chamber from a suction pressure ($D_A$) to a discharge pressure ($D_E$), wherein the piston rod sealing system comprising at least two chamber rings arranged one after the other in a longitudinal direction (L), each with at least one sealing element arranged therein, wherein a piston rod movable back and forth in the longitudinal direction (L) extends through the sealing elements as well as the chamber rings, wherein the piston rod is connected to the piston, wherein the piston rod sealing system has an inlet side (E) and an outlet side (A), the pressure of the compression chamber being applied to the inlet side (E), wherein at least one pressure sensor for measuring at least the dynamic pressure component ($D_D$) of a leakage gas located in the chamber rings is provided, and wherein a storage and evaluation unit stores a plurality of measured dynamic pressure components ($D_D$), and wherein the evaluation unit monitors a change in the dynamic pressure component ($D_D$) as a function of time and derives therefrom a change in state of at least one of the sealing elements.

14. The monitoring system according to claim 13, wherein said monitoring system determines the dynamic pressure component ($D_D$) as the difference between the differential pressure ($D_K$) and the static pressure component ($D_S$).

15. The monitoring system according to claim 13, wherein the sealing elements are designed as friction rings resting against the piston rod, and wherein a pressure sensor is arranged at least at the chamber ring arranged closest to the outlet side (A) for measuring at least the dynamic pressure component ($D_D$) of a leakage gas located in the chamber ring.

16. A monitoring system for monitoring the condition of a piston rod sealing system of a reciprocating compressor, wherein the piston compressor comprises a piston and a compression chamber, wherein a gas can be compressed by means of the piston in the compression chamber from a suction pressure ($D_A$) to a discharge pressure ($D_E$), wherein the piston rod sealing system comprising at least two chamber rings arranged one after the other in a longitudinal direction (L), each with at least one sealing element arranged therein, wherein a piston rod movable back and forth in the longitudinal direction (L) extends through the sealing elements as well as the chamber rings, wherein the piston rod is connected to the piston, wherein the piston rod sealing system has an inlet side (E) and an outlet side (A), the pressure of the compression chamber being applied to the inlet side (E), wherein at least one pressure sensor for measuring at least the dynamic pressure component ($D_D$) of a leakage gas located in the chamber rings is provided, and wherein a storage and evaluation unit stores a plurality of measured dynamic pressure components ($D_D$), and wherein the evaluation unit monitors a change in the dynamic pressure component ($D_D$) as a function of time and derives therefrom a change in state of at least one of the sealing elements;

wherein in the running direction (L) of the piston rod, starting from the inlet side (E), sealing elements designed as pressure breaker rings are arranged first, and wherein sealing elements designed as friction rings are arranged subsequently towards the outlet side (A), and wherein in the longitudinal direction (L) at least one pressure sensor is arranged between the pressure breaker rings and the sealing elements designed as friction rings.

17. A reciprocating compressor operated by a method according to claim 1.

* * * * *